(12) United States Patent
Lin et al.

(10) Patent No.: US 8,272,784 B2
(45) Date of Patent: Sep. 25, 2012

(54) SLEEVE BEARING SYSTEM

(75) Inventors: Yung-Ping Lin, Taipei Hsien (TW);
Dung-Chang Yeh, Taipei Hsien (TW);
Deng-Chu Fu, Shenzhen (CN); Qiang Zhang, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 458 days.

(21) Appl. No.: 12/626,683

(22) Filed: Nov. 27, 2009

(65) Prior Publication Data
US 2011/0085751 A1 Apr. 14, 2011

(30) Foreign Application Priority Data
Oct. 12, 2009 (CN) .......................... 2009 1 0308201

(51) Int. Cl.
*F16C 27/00* (2006.01)
*F16C 32/06* (2006.01)
*F16C 33/72* (2006.01)

(52) U.S. Cl. ........ 384/215; 348/103; 348/119; 348/129; 348/130

(58) Field of Classification Search .................. 384/100, 384/107, 119–120, 130, 215, 220, 279, 103, 384/129
See application file for complete search history.

(56) References Cited

U.S. PATENT DOCUMENTS

| 3,439,962 | A | * | 4/1969 | Gothberg ........................ 384/107 |
| 4,093,323 | A | * | 6/1978 | Quandt et al. ................. 384/115 |
| 5,099,374 | A | * | 3/1992 | Ohkita et al. ............... 360/265.6 |
| 5,396,134 | A | * | 3/1995 | Mochizuki ................... 310/67 R |
| 5,463,861 | A | * | 11/1995 | Lorenz ............................. 57/339 |
| 5,575,355 | A | * | 11/1996 | Williams et al. ............. 184/55.1 |
| 5,606,475 | A | * | 2/1997 | Ishizuka .................... 360/99.08 |
| 5,610,462 | A | * | 3/1997 | Takahashi ....................... 310/90 |
| 5,638,233 | A | * | 6/1997 | Ishizuka .................... 360/99.09 |
| 5,727,882 | A | * | 3/1998 | Butler et al. .................. 384/536 |
| 5,914,837 | A | * | 6/1999 | Edwards et al. ........... 360/265.6 |
| 6,024,496 | A | * | 2/2000 | Shy ............................... 384/279 |
| 6,618,226 | B2 | * | 9/2003 | Prater ........................ 360/265.7 |
| 6,756,714 | B2 | * | 6/2004 | Alex et al. ..................... 384/279 |
| 6,762,518 | B1 | * | 7/2004 | Yamaguchi et al. ......... 310/67 R |
| 6,809,898 | B1 | * | 10/2004 | Prochazka ................. 360/99.08 |
| 6,914,358 | B2 | * | 7/2005 | Tokunaga et al. ............... 310/90 |
| 7,015,605 | B1 | * | 3/2006 | Peter et al. ....................... 310/51 |

(Continued)

FOREIGN PATENT DOCUMENTS
JP 2620393 * 3/1997

*Primary Examiner* — Marcus Charles
(74) *Attorney, Agent, or Firm* — Altis Law Group, Inc.

(57) ABSTRACT

An exemplary sleeve bearing system includes a bearing housing, a sleeve bearing and a resilient washer. The bearing housing defines a receiving hole therein. The receiving hole has a first diameter. The sleeve bearing has a second diameter which is slightly less than the first diameter, and the sleeve bearing is received in the receiving hole of the bearing housing. The resilient washer is received in the receiving hole of the bearing housing and is fitted around the sleeve bearing. The resilient washer is sandwiched between the bearing housing and the sleeve bearing and resiliently abuts an outer circumferential surface of the sleeve bearing to thereby mount the sleeve bearing in the receiving hole of the bearing housing.

7 Claims, 1 Drawing Sheet

U.S. PATENT DOCUMENTS

| | | | |
|---|---|---|---|
| 7,092,203 B2 * | 8/2006 | Inoue et al. | 384/107 |
| 7,109,620 B2 * | 9/2006 | Fujii et al. | 310/90 |
| 7,498,704 B2 * | 3/2009 | Otsuki et al. | 310/90.5 |
| 7,745,967 B2 * | 6/2010 | Zhang et al. | 310/85 |
| 2004/0190802 A1 * | 9/2004 | Gomyo et al. | 384/100 |
| 2006/0133705 A1 * | 6/2006 | Nakamiya et al. | 384/107 |
| 2006/0291757 A1 * | 12/2006 | LeBlanc et al. | 384/107 |
| 2008/0056627 A1 * | 3/2008 | Horng et al. | 384/100 |

* cited by examiner

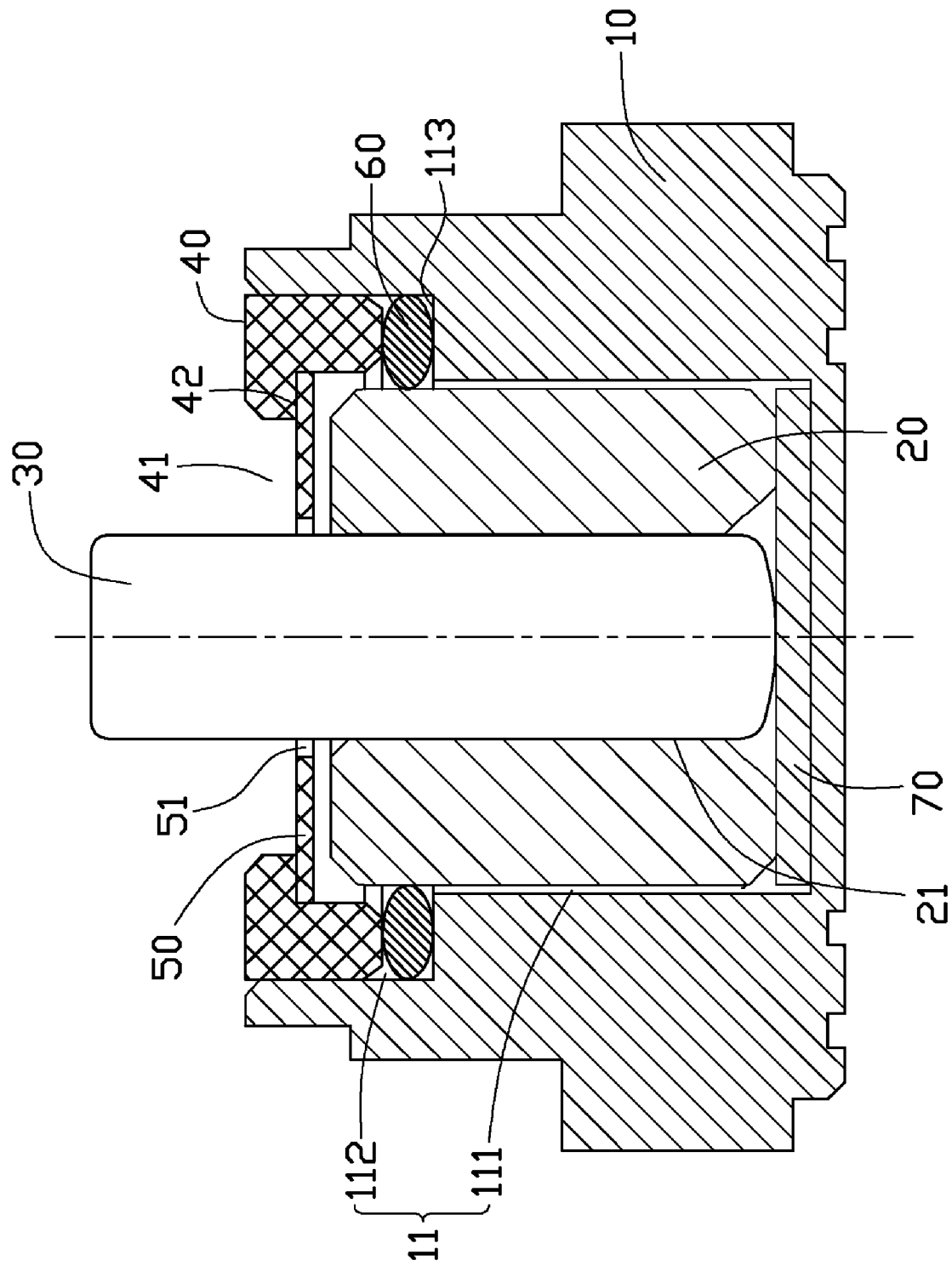

SLEEVE BEARING SYSTEM

BACKGROUND

1. Technical Field

The disclosure generally relates to bearing systems, and particularly to a sleeve bearing system for motors.

2. Description of Related Art

Sleeve bearings are widely used in bearing systems of motors, such as fan motors or disk drive motors in computers. Sleeve bearings reduce abrasion of shafts in the motors, and decrease noise from the motors.

A typical sleeve bearing system includes a shaft, a sleeve bearing and a bearing housing. The bearing housing defines a mounting hole therein receiving the sleeve bearing. The sleeve bearing is mounted in the mounting hole of the bearing housing by interference fit. The sleeve bearing defines a through hole therein rotatably receiving the shaft. The shaft is connected with a rotatable member, such as an impeller of a fan. A material of the sleeve bearing is porous, for absorbing lubricant which lubricates the shaft during rotation of the shaft. Since the sleeve bearing is porous and mounted in the bearing housing by interference fit, the bearing housing applies pressure on the sleeve bearing and the through hole of the sleeve bearing is thus easily compacted. When this happens, friction between the sleeve bearing and the shaft is increased, reducing efficiency and generating more noise.

Therefore, it is desirable to provide a sleeve bearing system which can overcome the limitations described.

BRIEF DESCRIPTION OF THE DRAWINGS

Many aspects of the embodiments can be better understood with reference to the following drawing. The components in the drawing are not necessarily drawn to scale, the emphasis instead being placed upon clearly illustrating the principles of the present disclosure. Moreover, in the drawing, like reference numerals designate corresponding parts.

The figure is a cross section of a sleeve bearing system in accordance with an exemplary embodiment of the present disclosure.

DETAILED DESCRIPTION

Referring to the figure, a sleeve bearing system according to an exemplary embodiment of the present disclosure includes a bearing housing 10, a sleeve bearing 20 received in the bearing housing 10, a mounting ring 40 received in and mounted at a top of the bearing housing 10, an oil-retaining cover 50 positioned at a top of the sleeve bearing 20, a resilient washer 60 fitted around the sleeve bearing 20, a support pad 70 positioned at a bottom of the sleeve bearing 20, and a shaft 30 rotatably inserted in the sleeve bearing 20.

The bearing housing 10 has a generally U-shaped cross section with a bottom end thereof closed. Thus the bearing housing 10 defines a bottom closed end and a top open end. A receiving hole 11 is defined in the bearing housing 10. The receiving hole 11 includes a first hole section 111 adjacent to the closed end of the bearing housing 10 and a second hole section 112 adjacent to the open end of the bearing housing 10. The first hole section 111 and the second hole section 112 communicate with each other, and an inner diameter of the first hole section 111 is less than that of the second hole section 112. Thereby, an annular step 113 is formed on an inner surface of the bearing housing 10 where the first hole section 111 adjoins the second hole section 112.

The sleeve bearing 20 is substantially cylindrical, with a bearing hole 21 defined therein along an axial direction thereof. The bearing hole 21 is configured for rotatably receiving the shaft 30. The sleeve bearing 20 is made of porous metal. The sleeve bearing 20 is saturated with lubricant oil, which lubricates the shaft 30 during rotation of the shaft 30. The sleeve bearing 20 is shorter than a depth of the receiving hole 11 of the bearing housing 10 but longer than a depth of the first hole section 111 of the bearing housing 10, whereby a lower portion of the sleeve bearing 20 is received in the first hole section 111 of the bearing housing 10 and an upper portion of the sleeve bearing 20 protrudes into the second hole section 112 of the sleeve bearing 20. An outer diameter of the sleeve bearing 20 is slightly less than the inner diameter of the first hole section 111 of the bearing housing 10, and the sleeve bearing 20 is loosely received in the first hole section 111 of the bearing housing 10.

The support pad 70 is disposed at the closed end of the bearing housing 10, axially supporting the shaft 30 in the sleeve bearing 20. The support pad 70 is of an abrasion resistant material and provided with high lubricity, reducing friction between the support pad 70 and the shaft 30.

The resilient washer 60 is substantially annular and made of a resilient material, which in the present embodiment is rubber or silicone. The resilient washer 60 is located on the step 113 of the bearing housing 10, and surrounds an upper portion of the sleeve bearing 20. The resilient washer 60 is sandwiched between the bearing housing 10 and the sleeve bearing 20.

The mounting ring 40 is generally annular, with a through hole 41 defined therein. An upper portion of the mounting ring 40 protrudes inwardly to form an annular blocking portion 42 extending into the through hole 41. An outer diameter of the mounting ring 40 is slightly greater than the inner diameter of the second hole section 112 of the bearing housing 10, such that the mounting ring 40 is mounted in the second hole section 112 via interference fit. The resilient washer 60 is positioned between a bottom end of the mounting ring 40 and the step 113 of the bearing housing 10.

The oil-retaining cover 50 is substantially annular. An outer diameter of the oil-retaining cover 50 exceeds an inner diameter of the blocking portion 42, and is less than the diameter of a lower portion of the through hole 41 of the mounting ring 40. The oil-retaining cover 50 is disposed between the blocking portion 42 of the mounting ring 40 and the sleeve bearing 20, preventing the lubricating oil in the sleeve bearing 20 from escaping to an exterior of the sleeve bearing system and preventing contamination from entering the sleeve bearing system. The oil-retaining cover 50 defines a through hole 51 therein, with the shaft 30 extending through the through hole 51. A diameter of through hole 51 of the oil-retaining cover 50 is greater than an outer diameter of the shaft 30.

During assembly of the sleeve bearing system, the support pad 70, the sleeve bearing 20, the resilient washer 60, and the oil-retaining cover 50 are disposed in that order in the receiving hole 11 of the bearing housing 10. Thereafter, the mounting ring 40 is impelled to be interferentially received in the second hole section 112 of the bearing housing 10. The resilient washer 60 is compressed between the mounting ring 40 and the step 113 of the bearing housing 10 along an axial direction thereof, and the resilient washer 60 resiliently expands outwardly and inwardly along radial directions thereof to resiliently abut an outer surface of the sleeve bearing 20. Thus, the sleeve bearing 20 is firmly mounted in the bearing housing 10. The sleeve bearing 20 is loosely received in the first hole section 111 of the bearing housing 10 and resists resilient force from the resilient washer 60. Therefore when the sleeve bearing 20 is mounted in the bearing housing 10 by interference fit, the risk of compaction of the through hole 21 of the sleeve bearing 20 is greatly reduced. This promotes the efficiency of operation of the sleeve bearing system and decreases noise generated by the sleeve bearing system.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sleeve bearing system, comprising:
   a bearing housing defining a receiving hole therein, the receiving hole having a first diameter;
   a sleeve bearing having a second diameter slightly less than the first diameter, the sleeve bearing being received in the receiving hole of the bearing housing;
   a resilient washer received in the receiving hole of the bearing housing and fitting around the sleeve bearing, the resilient washer being sandwiched between the bearing housing and the sleeve bearing and resiliently abutting an outer surface of the sleeve bearing to thereby mount the sleeve bearing in the receiving hole of the bearing housing;
   wherein the receiving hole comprises a first hole section and a second hole section, a diameter of the first hole section is the first diameter, and the second hole section has a third diameter greater than the first diameter, whereby a step is formed on an inner surface of the bearing housing where the first hole section adjoins the second hole section, and the resilient washer is positioned on the step;
   wherein the sleeve bearing system further comprising a mounting ring held in the second hole section of the bearing housing by interference fit, the resilient washer being compressed between the mounting ring and the step of the bearing housing; and
   wherein the mounting ring is annular with a through hole defined therein, an upper portion of the mounting ring protrudes inwardly to form an annular blocking portion, an inner diameter of the blocking portion being less than the first diameter of the receiving hole.

2. The sleeve bearing system of claim 1, further comprising a shaft and an oil-retaining cover, the oil-retaining cover positioned between the blocking portion of the mounting ring and the sleeve bearing and defining a through hole therein through which the shaft extends, a diameter of the through hole exceeding an outer diameter of the shaft.

3. The sleeve bearing system of claim 1, wherein the bearing housing defines a closed end and an opposite open end, the first hole section is located adjacent to the closed end of the bearing housing, and the second hole section is located adjacent to the open end of the bearing housing.

4. The sleeve bearing system of claim 3, further comprising a support pad at the closed end of the bearing housing, the support pad configured for axially supporting an end of a shaft.

5. The sleeve bearing system of claim 1, wherein the sleeve bearing is made of porous metal.

6. The sleeve bearing system of claim 1, wherein the resilient washer is made of one of rubber and silicone.

7. A sleeve bearing system, comprising:
   a bearing housing defining a receiving hole therein, a step being formed on an inner surface of the bearing housing;
   a sleeve bearing received in the receiving hole of the bearing housing, a cylindrical gap defined between the sleeve bearing and the bearing housing;
   a resilient washer positioned on the step of the bearing housing and fitted around the sleeve bearing;
   a mounting ring mounted in the receiving hole of the bearing housing, the resilient washer being compressed between the mounting ring and the step of the bearing housing and abutting an outer circumferential surface of the sleeve bearing thereby mounting the sleeve bearing in the receiving hole of the bearing housing;
   wherein the receiving hole comprises a first hole section and a second hole section, an inner diameter of the first hole section is less than that of the second hole section, the step is formed where the first hole section adjoins the second hole section, and the gap is located in the first hole section; and
   wherein the mounting ring is interferentially mounted in the second hole section of the bearing housing.

\* \* \* \* \*